(12) United States Patent
Dupielet et al.

(10) Patent No.: US 9,665,082 B2
(45) Date of Patent: May 30, 2017

(54) METHOD FOR CONFIGURING A HOME AUTOMATION INSTALLATION AND TOOL FOR IMPLEMENTING SAME

(75) Inventors: Norbert Dupielet, Sallanches (FR); Michel Fournet, Cuvat (FR); Frédéric Maraval, Passy (FR); Serge Neuman, Seynod (FR)

(73) Assignee: SOMFY SAS, Cluses (FR)

( * ) Notice: Subject to any disclaimer, the term of this patent is extended or adjusted under 35 U.S.C. 154(b) by 1083 days.

(21) Appl. No.: 12/527,704

(22) PCT Filed: Feb. 20, 2008

(86) PCT No.: PCT/IB2008/050602
§ 371 (c)(1),
(2), (4) Date: Oct. 23, 2009

(87) PCT Pub. No.: WO2008/102306
PCT Pub. Date: Aug. 28, 2008

(65) Prior Publication Data
US 2010/0097238 A1   Apr. 22, 2010

(30) Foreign Application Priority Data

Feb. 20, 2007 (FR) .................................... 07 01204

(51) Int. Cl.
*G05B 19/02* (2006.01)
*G05B 19/042* (2006.01)
*G06F 15/177* (2006.01)

(52) U.S. Cl.
CPC ....... *G05B 19/0426* (2013.01); *G06F 15/177* (2013.01)

(58) Field of Classification Search
CPC ..................................................... G06F 15/177
(Continued)

(56) References Cited

U.S. PATENT DOCUMENTS 5,519,878 A    5/1996  Dolin, Jr.
5,854,594 A *  12/1998 Lin et al. ..................... 340/4.42
(Continued)

FOREIGN PATENT DOCUMENTS

EP    0 838 740 A    4/1998
EP    1 274 199 A    1/2003
(Continued)

*Primary Examiner* — Steven Lim
*Assistant Examiner* — Kam Ma
(74) *Attorney, Agent, or Firm* — Haug Partners LLP (57) ABSTRACT

Method of configuring equipment in a home automation installation, each item of equipment being identified thanks to an identifier recorded in memory and duplicated on an accessible medium so as to be visible, the configuring method using a configuring tool comprising an inputting means, a signal transmission means and at least a first memory and a second memory, the method comprising several iterations of the following steps:

the step of generating, in the configuring tool, a message comprising the content of the first memory intended for receiving, after an input, the identifier of an item of equipment and the content of the second memory intended for receiving, after an input, information of a first type;

the step of transmitting, by the radio signal transmission means, the message in the form of an electromagnetic signal; and the step of carrying out, in the item of equipment, an action at least partially determined by the information of the first type.

17 Claims, 8 Drawing Sheets

(58) Field of Classification Search
USPC ........ 340/4.3–4.37, 5.22–5.25, 12.23–12.29, 340/13.21
See application file for complete search history.

(56) References Cited

U.S. PATENT DOCUMENTS

| | | | |
|---|---|---|---|
| 5,909,183 A * | 6/1999 | Borgstahl et al. | 340/12.29 |
| 5,962,839 A * | 10/1999 | Eskildsen | G09B 5/062 |
| | | | 235/375 |
| 6,157,319 A * | 12/2000 | Johns et al. | 340/12.24 |
| 6,225,938 B1 | 5/2001 | Hayes et al. | |
| 6,339,798 B1 * | 1/2002 | Cheron et al. | 710/9 |
| 6,549,143 B1 * | 4/2003 | O'Donnell et al. | 340/12.53 |
| 6,650,247 B1 * | 11/2003 | Hayes | 340/12.28 |
| 6,826,267 B2 * | 11/2004 | Daum et al. | 379/102.03 |
| 7,353,995 B2 * | 4/2008 | Strickland | 235/462.01 |
| 7,679,525 B2 * | 3/2010 | Nielsen | 340/693.1 |
| 7,877,588 B2 * | 1/2011 | Gharapetian | 713/1 |
| 8,140,192 B2 * | 3/2012 | Liao et al. | 700/276 |
| 8,232,861 B2 * | 7/2012 | Tsou | 340/5.25 |
| 2002/0023960 A1 * | 2/2002 | Knowles et al. | 235/472.01 |
| 2002/0043938 A1 * | 4/2002 | Lys | 315/149 |
| 2002/0044042 A1 * | 4/2002 | Christensen et al. | 340/3.54 |
| 2004/0000898 A1 * | 1/2004 | Pool | G01R 31/023 |
| | | | 324/66 |
| 2004/0222300 A1 * | 11/2004 | Strickland | 235/462.15 |
| 2005/0162271 A1 * | 7/2005 | Leitch | G01S 5/0289 |
| | | | 340/539.13 |
| 2006/0161865 A1 * | 7/2006 | Scott et al. | 715/810 |
| 2006/0190138 A1 * | 8/2006 | Stone et al. | 700/276 |
| 2008/0271123 A1 * | 10/2008 | Ollis et al. | 726/4 |
| 2010/0097238 A1 * | 4/2010 | Dupielet et al. | 340/825.22 |

FOREIGN PATENT DOCUMENTS

| | | |
|---|---|---|
| EP | 1 659 462 A | 5/2006 |
| FR | 2 761 183 A | 9/1998 |
| FR | 2 841 016 A | 12/2003 |
| FR | 2841016 A1 * | 12/2003 |
| WO | WO 02/33496 A | 4/2002 |
| WO | WO 0233496 A1 * | 4/2002 |
| WO | WO 2004/092853 A | 10/2004 |

* cited by examiner

METHOD FOR CONFIGURING A HOME AUTOMATION INSTALLATION AND TOOL FOR IMPLEMENTING SAME

This application is a 371 of PCT/IB2008/050602 filed on Feb. 20, 2008 published on Aug. 28, 2008 under publication number WO 2008/102306 A and claims priority benefits to French application number 07/01204 filed Feb. 20, 2007, the entire disclosure of which is incorporated herein by reference.

BACKGROUND OF THE INVENTION

The invention relates to the field of home automation control installations for controlling the movement of opening members in homes, such as for example blinds, doors, windows, garage doors, front gates, screens or solar protection devices of various types.

DESCRIPTION OF THE PRIOR ART

These control installations generally comprise control points, whether mobile or fixed, and actuators, for actuating the movement of opening members in homes.

The control points comprise a command transmitter and generally have a user interface, which may be relatively sophisticated, enabling a user to send control commands to the actuators. The interface may thus comprise opening, closing or movement-stopping control pushbuttons.

The control points may also be sensors or automatic control devices, with or without a user interface.

An actuator comprises a command receiver, enabling it to receive and interpret messages coming from the transmitters of the control points.

In the simplest systems, communication between command transmitter and command receiver is of one-way type.

In other, two-way, communication systems, the receiver and the transmitter may receive a communication message which is sent directly to them.

In such a home automation installation, the control commands are transmitted from the control points to the actuators by wire or wireless means. Communications between command transmitters and command receivers take place in a very generalized manner over a non-wired network, i.e. via electromagnetic waves and more particularly radio waves.

For security and confidentiality reasons or even simply because of the omnidirectionality of radio, it is necessary, prior to the use of such a home automation installation, to pair the transmitters and receivers that have to communicate with one another. This method consists, for example, in recording, by a particular procedure called pairing, an address containing a transmitter identifier at the receiver. The pairing may also consist in recording a receiver identifier in the transmitter, or even in exchanging the two identifiers. The pairing procedure therefore consists in establishing a virtual link between a transmitter, or generally a control point, and a receiver or, by extension, an actuator.

Once this virtual link has been established, the transmitter is capable of transmitting communication frames that the receiver will receive and process.

A communication frame, and in particular a control frame, comprises, in addition to the command associated therewith, the address of the transmitter sending the message and/or the address of the addressee. Thus, upon transmission of a control frame, each tuned-in receiver decrypts the message contained in the frame, checks that the latter is properly addressed thereto or if it contains an address that it accepts, and generates an execution command for the actuator.

If the address contained in the frame is not known, the receiver disregards the control message.

In the field of the invention, the configuring of the actuator or its receiver therefore includes steps for pairing with various transmitters. The configuring also includes steps for regulating the actuator. These generally consist in making the actuator carry out a certain number of movements that enable it to determine its operating parameters. These steps may be carried out automatically or semiautomatically by the actuator. For example, the movements are movements toward end-of-travel positions, up to the point of detecting them, or complete operating cycles for determining a travel time, the weight of the screen to be operated, or an operating force curve for example. During these configuring movements, an electronic unit of the actuator detects parameters and records them. Once the actuator has been configured, it is capable to moving the screen controlled within limits fixed by the saved parameters, when it receives an opening or closing command generated by a transmitter.

These physical parameter pairing or configuring steps are particularly important and give rise to very different control actions depending on the equipment, often involving transmitters having keypads with generally few buttons.

Figure 1:
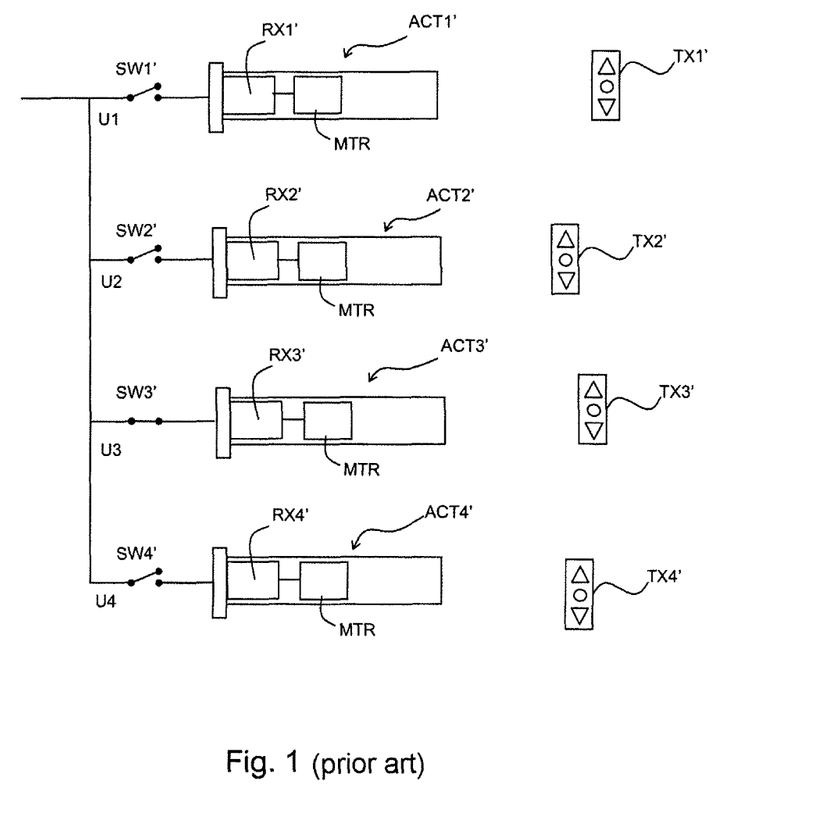
FIG. 1 is a diagram of a home automation installation known from the prior art.
Figure 2:
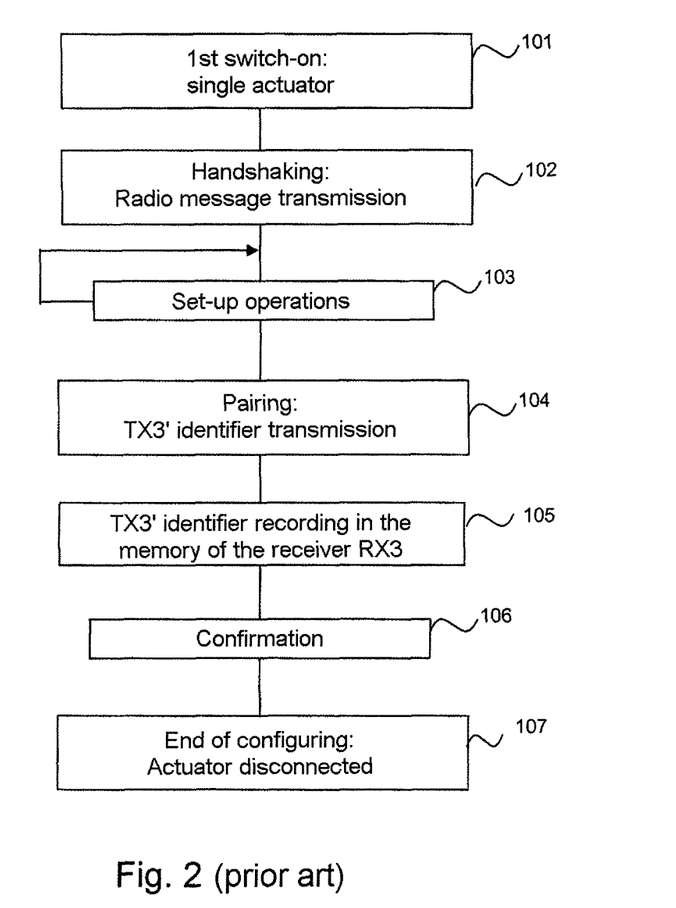
FIG. 2 is a flowchart for a procedure for configuring a home automation installation according to the prior art.

FIGS. 1 and 2 illustrate a configuring method as implemented in the prior art. The home automation system 1 comprises a plurality of actuators ACT1', ACT2', ACT3', ACT4' each comprising a gear motor MTR, and a radio receiver, the receivers being denoted by RX1', RX2', RX3', RX4' respectively. Each actuator also includes a control unit which hereafter will be considered to be within the receiver of the actuator.

Each of these actuators is connected to a supply line U1, U2, U3, U4 via an individual switch SW1', SW2', SW3', SW4'. An elementary switch consists of an electrical terminal block.

In step 101 during installation, only the switch SW3' is closed. The actuator ACT3' is therefore the only radio actuator supplied in the radio space (consisting of the radio reception range of the receiver RX3' of the actuator ACT3'). This aspect is imperative.

The first time the actuator ACT3' (or other means, explained in detail later on) is energized, it is placed in a particular mode called set-up mode. It then awaits a message coming from any transmitter. Starting with one transmitter, the installer sends a dialog handshake signal by a particular action on the transmitter (for example by holding down the keys corresponding to "up" and "down"). This corresponds to step 102. This signal signifies to the actuator ACT3' that it must be receptive to set-up commands or to the pairing with a new transmitter. The installer may then continue with a series of set-up operations on the actuator ACT3', using a transmitter (the one serving for the handshake or another) (step 103). Each of these set-up operations must be carried out in a precise order or correspond to a particular action on the transmitter buttons. During these configuring steps, operating parameters are stored in memory. Once the set-up operations have been completed, the actuator awaits the pairing with a transmitter. This pairing may take place later during the installation. The actuator then remains unpaired until a new supply and handshake. From a new transmitter TX3', the installer, for example by pressing on a programming button, transmits a signal containing an identifier of the transmitter TX3' (step 104). This is stored in the memory of the receiver RX3' (step 105). The installer must validate this operation (step 106, confirmation by a particular action on the transmitter).

Before any other configuring involving a new actuator, it is imperative to again disconnect the actuator ACT3' by opening the switch SW3' (step 107).

As described, the transmitters are put to heavy use during the set-up operations, which involves very elaborate actions including long or short keystrokes, combinations of keystrokes, in order to transmit very particular programming commands at each step of the method. Likewise, the actuators must be selectively connected or disconnected, thereby extending the time required to configure the installation.

In addition, inputting in set-up mode is not necessarily easy. In the home automation field associated with opening members in homes, it is often difficult to physically access the actuators once they have been installed, and consequently it is sometimes difficult to configure this actuator. It is not always possible to have a programming button the activation of which enables the actuator to be placed in anticipation of a set-up or registration operation.

For a first set-up operation, the receiver may be automatically placed in set-up mode during the first energization. It is also possible to reproduce this input in set-up mode thanks to a particular sequence of cutting off the supply to the actuator.

Moreover, a normally radio-controlled product may, under certain conditions, also be controlled or configured via the mains, by interrupting the supply voltage. Patent application EP 1 274 199 in fact explains this method in detail, which, as in the previous cases, requires each actuator to be connected to an electrical line specific thereto.

For new set-up operations or pairings, other means must or may be employed.

One procedure for pairing a first transmitter with an inaccessible receiver, followed by the pairing of new transmitters under the control of the known first transmitter, is described in document FR 2 761 183.

Although this procedure is relatively simple, it also has some drawbacks, in particular if several actuators are connected to the same electrical line. If the only transmitter is broken or defective, it is no longer possible to distinguish one actuator from the others, for pairing it with a new transmitter. Such electrical configuring for connecting the actuators is therefore strongly discouraged. In addition, the use of a known transmitter for placing a receiver in set-up mode again requires the use of various actions on an interface often having a limited number of buttons.

Patent application FR 2 841 016 describes the problem of accessing the receivers on a work site and the means of simplifying the pairing in an office building. A tool is then used to record information characterizing a receiver or a transmitter and to transmit this information to the other object. In one particular embodiment, the tool is provided with a barcode scanner, thereby enabling it to read an optical label (barcode) placed on the transmitter and reproducing its reference or identifier. The transmitter identifier may also be read by galvanic coupling or magnetic coupling or by optical means (photodiodes and phototransistors).

Moreover, the actuators and automatic control devices (controls, sensors, control units) compatible with an LON bus are also provided with an identifier that characterizes them uniquely. In particular, control units, which are associated with one or more actuators and enable them to be controlled, are generally provided with a detachable label on which a barcode is reproduced, corresponding to the identifier of the control unit.

The identifiers of the various control units or automatic control devices are read by a barcode reader connected to the installation PC. This PC stores the various information. These identifications enable the PC to have a precise image of the complete architecture of the installation. The reconfiguring of the network or its modification (introduction of a new element) again has to involve the PC and the overall view of the system, in particular since the aim of the protocol is to place groups for communication between the products.

The identification of an electrical equipment item (in the HI-FI equipment field) by a barcode is also known, for example from document U.S. Pat. No. 6,225,938. In that document, the barcode indicates the type of apparatus and the remote control format to which it responds. The reading of this barcode by a remote control device provided with a scanner enables said device to be possibly reconfigured so as to be capable of communicating with the equipment, if this device per se possesses the data or programs for the required communication protocol. U.S. Pat. No. 5,519,878 describes a similar solution.

However, in this case, no pairing problem exists insofar as the remote control device controls the equipment by an infrared signal (targeted beam) and delivers the expected format thereto. Moreover, the barcode does not translate information characterizing the equipment itself (in a unique manner), but only the type of equipment and its communication format.

Finally, by reading information on the barcode labels it is possible to configure the remote control device (or the reader), but not the equipment to be controlled.

The object of the invention is to provide a method of configuring equipment that remedies the abovementioned drawbacks and improves the known configuring methods of the prior art. In particular, the invention proposes a configuring method in which the selective communication via electromagnetic waves between particular home automation equipment of an installation and a configuring tool having a very simple structure is possible without prior intervention on the particular equipment and, in particular, without prior intervention on its power supply.

In particular, the configuring method is applicable independently of knowledge by the tool of the home automation system already installed and of the physical links (supply lines) or virtual links (pairings) already established involving the receiver or the equipment around it.

SUMMARY OF THE INVENTION

The method according to the invention is defined by claim 1.

Various embodiments of the configuring method are defined by dependent claims 2 to 13.

The configuring tool according to the invention is defined by claim 14. Various embodiments of the configuring tool are defined by dependent claims 15 to 17.

The configuring method is based on the principle that information characterizing the receiver (especially its identifier), recorded in the memory of the receiver, is reproduced on a medium placed so as to be accessible to an installer and readable by a particular reader.

By reading this information it is possible to identify most precisely the receiver and to address radio (and therefore omnidirectional) messages for its sole attention.

Storing the information characterizing the receiver, called the identifier, may be carried out at various stages during the production of the actuators. For example, the identifier is recorded in memory at the moment of assembling the electronic components, for example at the moment of copying the software into a microprocessor associated with the receiver.

This identifier is duplicated on a medium possibly remote from the receiver. This is because it is unnecessary for the information characterizing the actuator to be close to the latter: Unlike a pushbutton mounted directly on the product, in order to activate a particular operating mode, especially a pairing mode, no electrical or mechanical link is necessary.

The medium for this identifier may for example be a magnetic label, a perforated card, an RFID label or a barcode label. The latter is preferably attached to the actuator on a detachable medium (for example repositionable self-adhesive labels). Barcodes have the benefit of being quite easily reproducible and they can be easily read by a particular reader known per se.

Duplication may take place at the same moment as the information is recorded in the memory of the receiver, or this may be later in the distribution chain.

In particular, a roller blind actuator may be integrated into the blind, and this step is usually carried out by an integrator. The latter may, during energization and using a particular tool, recover the identifier contained in the memory of the receiver and then manufacture readable labels.

A label can therefore be bonded to one lath of the blind, while another copy is preserved with the notice or in the packaging box.

The latter operation may also take place during installation of the motor-operated roller blind on a work site.

It follows that the identifier of the actuator, when the latter is installed and inaccessible, remains available for being read using a tool. Since the label is bonded to a blind lath, on the dwelling interior side of course, it is therefore accessible only from inside and does not represent a lack of security.

In the case of an actuator for a garage door for example or a front gate, which are much more exposed, the duplicate of the identifier may be kept in a safe place.

For a home automation system, it is in fact quite conceivable to store the various duplicated identifiers on a board with a representation of the plan of the dwelling or building, or on which it is possible by writing to indicate to which actuator (kitchen blind actuator, nursery/west wall actuator, mezzanine skylight actuator, etc.) the label corresponds. This board will be kept in a safe place.

The tool easily creates a link with a receiver of the home automation installation. Being capable of easily identifying a single actuator from among several, especially if these are connected to the same electrical line, the tool can transmit configuring commands to an identified actuator, without necessarily being itself identified. No prior pairing procedure is necessary between the tool and the receivers of the system. The tool can therefore be easily used at any moment during the life of the installation (set-up, reconfiguring, etc.).

Although the tool can completely control the movement of the actuator and not merely allow it to be configured, it is preferably used temporarily in an installation. At any moment, it is possible to use the tool again to modify or update an installation. It is unnecessary to pair the tool with each receiver because it is capable of transmitting messages with a read receiver identifier (and possibly a read transmitter identifier): an identifier specific to the tool does not need to be transmitted. However, such a pairing is possible.

Apart from the information associated with objects (transmitter, receiver) of the home automation installation, the tool can be used for reading characteristic set-up or control function codes.

Preferably, the readable information comprises characteristics of the type of information.

This is for example the case if the readable information comprises, on the one hand, a code determining the type of information (object family or function family) and, on the other hand, a unique identifier of the object. During the step of inputting (reading) the various codes, the reader is capable of recognizing the various types of codes and classifies by itself the information according to the type defined in the code read. This information can then be stored in memories associated with each type of information.

In the field in question, the number of objects in the installation or the number of functions and their parameters is definable, i.e. there exists at least a limited number of functions or more precisely a limited number of families of functions, and also a limited number of types of objects communicating in the home automation installation (receivers, transmitters, automatic control devices).

A family of functions may be characterized by its parameters. For example, a recording-type function (pairing) has to be accompanied by a transmitter identifier and a receiver identifier. A family of functions of the "automatic low end-of-travel set-up" type requires as parameter only a receiver identifier. A family of functions of the "sensitivity threshold set-up" type requires, as parameter, a receiver identifier and possibly a threshold level.

Thus, it is possible to distinguish at least three simple families of configuring functions, the parameters of which are the following:

family 1: an actuator identifier;
family 2: an actuator identifier and a transmitter identifier,
family 3: an actuator identifier and a threshold.

Other function families with other parameters may be imagined, for example a family having as first parameter a transmitter identifier for configuring a transmitter. Another function family may have as parameters two identifiers of objects of the same type so that they can communicate with each other or so as to define a hierarchical relationship between them.

It is highly advantageous to classify the types of objects or the types of functions so that the tool can easily identify the type of information read and write it into a corresponding memory.

Thus, it is unnecessary to impose an order in which the necessary information is read.

Moreover, this allows the installer to be offered a basic but very functional visual interface. This interface will be described in relation to the figures.

The interface and the feedback action may be determined so as to indicate to the installer what the tool has already stored in memory and/or the awaited types of information.

Moreover, if each item of information read is recorded in a very particular memory, it is possible to further simplify the action for configuring an installation.

Specifically, a function code may be stored in memory as long as necessary for setting up several actuators. It is therefore sufficient for the installer, after carrying out a first function for setting up an actuator, to use the tool to input only the identifiers of the actuators and to confirm for each following identical set-up.

At the same time, the identifier of an actuator may be stored in memory if no other code is input, and several set-up functions may be implemented by means of the tool without re-inputting the actuator identifier.

Reading a new function, a new function parameter or a new identifier replaces the previous content of the corresponding memory. The contents of the memories may also be erased after a predetermined time of inactivity of the tool.

The configuring operation carried out according to the method described is particularly simple. The method has the very important advantage of simplifying all the pairing and set-up actions. This is because, in a conventional configuring operation, and depending on the applications and the interfaces, the actions will be different and the installer must regularly check the installation procedures, even if he is familiar with the various products installed.

Insofar as the tool consists of a reader and a signal transmitter, and its function is essentially to integrate, into a radio message, the information read and to redistribute it, the tool is of lasting use. The responses to a message coming from the tool are processed within the actuator.

In a preferred embodiment, the tool also has a very simple display system, made up of a few light-emitting diodes. These light-emitting diodes provide the installer with visual feedback, especially as regards the information stored in memory and/or the awaited information.

Pairing

The pairing between a transmitter and an actuator may be performed in two ways:
  by simply reading the two items of information associated with a transmitter and an actuator respectively, in which case, during confirmation of said information, the tool understands that this is a pairing function and transmits a corresponding command. The actuator may be set up by means of a conventional transmitter or by the tool itself. The latter may then have a more sophisticated control interface, making it possible to select and transmit configuring commands very simply;
  by reading a "recording"-type function code and the information associated with a transmitter and an actuator. This alternative will be described in relation to the setting-up part and the corresponding FIGS. 3 to 7.

To safeguard the pairing, it is possible to request confirmation of a recording of a transmitter identifier at a receiver when the latter has already been paired with a first transmitter. This confirmation may for example take the form of a message sent by one of the known transmitters, transmitted within a temporary range following exchange of the new identifier using the tool.

This request may be placed for each receiver once the installation has been configured. In this way, the installation is perfectly secure against any attempted fraud, just as it is possible to safeguard an existing installation by inhibiting the set-up mode function, for example by a double mains cut-off.

Moreover, the invention makes it possible, by greatly simplifying the pairing, to temporarily pair a transmitter with a receiver and to use the latter to configure the actuator, in a manner similar to that of the prior art.

This temporary link may be constructed in a manner slightly different from a permanent pairing link, i.e. the identifier of the temporary transmitter is retained only for a limited time enabling the set-up operations to be carried out. It is therefore unnecessary afterwards for the installer to unpair this temporary transmitter.

In this case, the tool has two confirmation buttons—one for the permanent pairing and one for the temporary pairing—or at least is capable of transmitting two messages, a temporary pairing message and a permanent pairing message. Once the information relating to a transmitter and to a receiver has been stored in memory, the installer confirms the temporary pairing by pressing the dedicated button. The transmitted message contains the temporary pairing information, and the receiver handles this information, for example by resetting to zero a time counter relating to this pairing.

If no configuring action is carried out by means of this identifier within a given period, the recording of the temporary identifier within the actuator is erased.

Alternatively, it is the tool itself that has a specific identifier and that the installer temporarily pairs with the various actuators in succession. The identifier of the tool may be read on a medium that can be detached, at least temporarily, from the tool, by the specific reader of the tool, or may simply be stored in memory and recalled by a specific button on the tool. This identifier is therefore stored in a memory dedicated to the transmitter identifiers. If the object to be paired is the tool itself (this being determined by checking the identifier in the memory), the pairing message is then automatically a temporary pairing message.

Set-Up

Within the context of one particular embodiment of the invention, a board or notice comprising function barcodes is supplied to a user.

Such a board is moreover known, for example from document U.S. Pat. No. 5,962,839. This document describes a reader that can be programmed by reading barcodes. This reader may be connected to an electric motor, essentially for a toy and provided with loudspeakers. By reading a plurality of barcodes it is possible to implement, within the reader, a sequence of control actions to be carried out, by means of the motor or various accessories.

In this document, which is in a field far from home automation, there is no problem as regards transmitting information remotely by wireless insofar as the motor or the accessories of the toy are connected directly to the reader. Moreover, the reading of the codes creates only executable control commands, in a conventional operating mode.

According to a first operating mode of the present invention, each actuator has in memory a number of codes, these being associated with configuring subroutines. These subroutines are specific to the actuator and/or to the application and correspond to configuring functions.

The installer has a board (NOT, FIG. 3) bearing a plurality of information items that can be read by the tool, for example barcodes, each item of information corresponding to a code (for example a digital code), at least part of which is equivalent to the codes in the memory of the actuators.

The board includes information common to several different actuators or is dedicated to one actuator. In the latter case, it may be provided with each actuator.

Alternatively, the information that can be read by the tool (installation object identifiers or function codes) appear on a screen connected to a system for managing the installation (computer, PDA), it being possible for said system to be local or to recover information remotely via the Internet from a secure central site. This screen then serves as information medium in the same way as the board described above.

The tool therefore serves as code reader and transmitter, i.e. it translates information read in the form of a digital code for example and integrates this digital code within a message that it transmits using a protocol recognized by the receivers of the installation.

As described above, apart from reading the code, the configuring tool is used for reading information characteristic of the targeted receiver, i.e. its identifier duplicated on an accessible and readable medium.

The message from the tool therefore contains the code relating to the subroutine to be carried out and an identifier of the actuator to which the message is addressed.

It is therefore entirely possible to add functions to a second-generation actuator and to use the same tool to transcribe codes for functions associated with first-generation or second-generation actuators. In this case, the installer is provided with a new function board, the tool remaining the same.

If the tool has a display screen, making it possible to display the function code or even the title of the function read on the board, this requires the tool itself to be updated, but this case is of course conceivable.

According to a second embodiment, not explained in detail, the tool has a much more sophisticated information processing unit. It therefore no longer functions simply as a simple reader with transmission of the information read, but is capable of transmitting more elaborate information to the receiver. In other words, the subroutines to be implemented for a particular set-up operation are defined in the tool, and the latter transmits configuring commands in sequence, for example a control to various positions, for implementing this set-up operation.

This second embodiment makes it possible to be compatible with products of previous generations. The tool may be regularly updated, by inputting new subroutines into the memories of the tool.

Moreover, the sequences to be carried out for a particular set-up operation may be learnt by the actuator. The tool then transmits, for a new function code, messages corresponding to actions to be carried out for this new function. The actuator stores these in memory so that, for a subsequent transmission of the function code learnt, it is sufficient simply to transmit the code so as to implement the corresponding set-up operation.

It is therefore possible to provide, within the actuator, "free" codes that can be used for writing these new set-up functions thereinto.

Additionally, one particularly advantageous application of the invention is for diagnosing at least part of the system. For example, when all the transmitters paired with an actuator appear to be not in use, it is not possible to verify whether the problem is a transmitter problem or an actuator problem. Using the tool, it is possible to select a receiver identifier, possibly a transmitter identifier, and for example a "diagnosis" function code. In this case, the receiver generates a series of movements predetermined by the diagnosis function code. Alternatively, the tool has control keys by which the actuator can be controlled directly once the latter has been identified.

The installer thus checks whether the actuator and its radio receiver are operating correctly or not.

The tool may also serve for diagnosing a response of the actuator to a command output by a sensor. For example, it is possible to simulate, via a function on the board, the transmission of a sensor signal with a given threshold. Depending on the expected reaction of the actuator, (for example the folding-up of a blind in an intermediate position) and on the actual reaction of the actuator, the installer can check that threshold transmission is carried out correctly.

If a single function for pairing and unpairing is provided, the transmission of a transmitter identifier already known to the receiver causes it to be unpaired, whereas a transmitter identifier unknown to the receiver will be stored in memory.

When the board has codes relating to recording functions and erasing functions respectively, the former advantageously serves, when a transmitter appears to be defective, for re-recording this already paired transmitter and for checking whether the problem derives from an identifier desynchronization, in the case of an identifier having a rotary code varying according to a predefined sequence at each transmission and synchronized relative to the receiver.

To solve problems regarding greater security, it is possible to make the operations described above secure. Various procedures may be carried out. One embodiment consists in using a key for the installation, this key also being in the form of information that can be read by the tool described and being specific to the installation. This key is kept in a safe place.

DESCRIPTION OF THE DRAWINGS

The appended drawings show, by way of examples, one embodiment of a configuring method according to the invention, one embodiment of an installation according to the invention and one embodiment of a configuring tool according to the invention.

DESCRIPTION OF THE PREFERRED EMBODIMENTS

Figure 3:
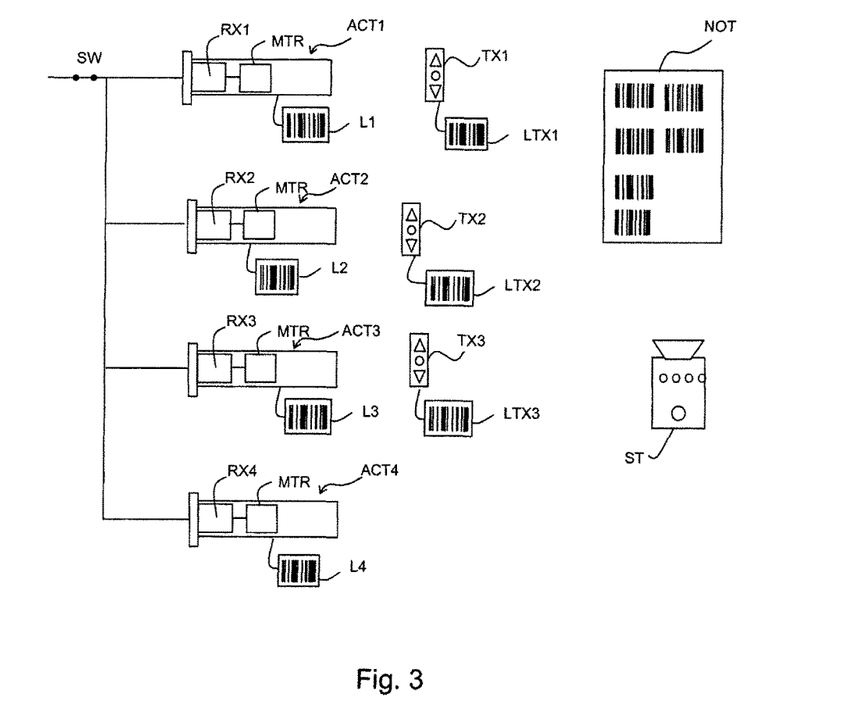
FIG. 3 is a diagram showing one embodiment of a home automation installation according to the invention.

The various actuators ACT1-ACT4 may be placed in the same way as in FIG. 1 or possibly in parallel. In this case, a single switch SW, for example in the electrical cabinet is sufficient for all the actuators, as shown in FIG. 3.

Each actuator ACT1-ACT4 has a label L1-L4 on which an identifier (IDRX1-IDRX4) of the actuator is duplicated in a format that can be read by a configuring tool ST.

Likewise, a transmitter TX3 to be paired has a label on which its identifier IDTX3 is duplicated.

Other transmitters TX1 and TX2 also have a label on which their identifier IDTX1, IDTX2 is duplicated.

Figure 4:
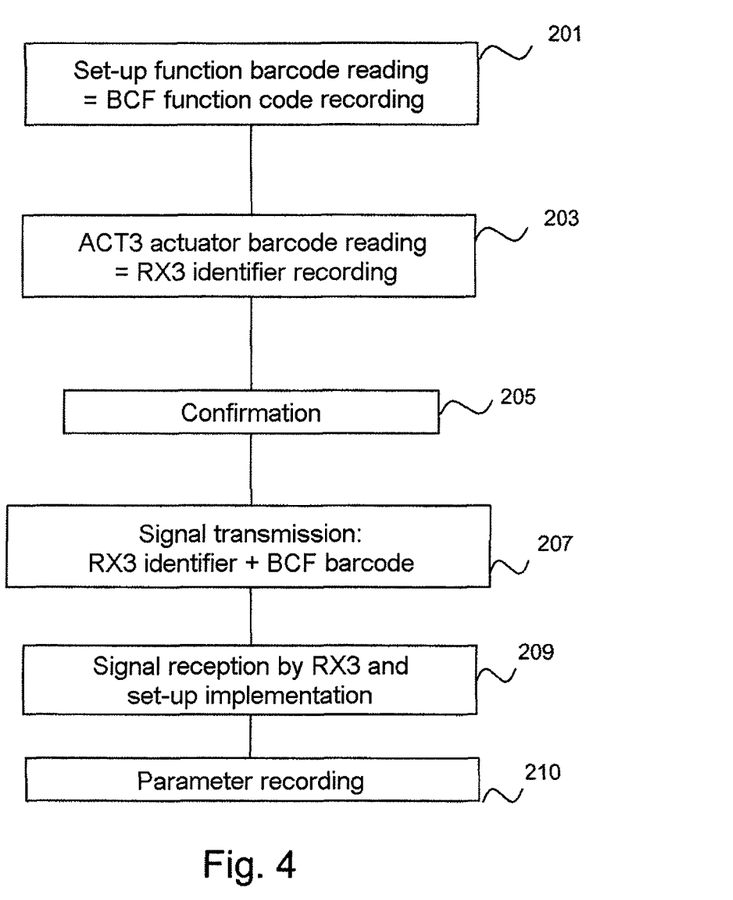
FIG. 4 is a flowchart for a configuring procedure implemented in an embodiment of a configuring method according to the invention.

FIG. 4 shows schematically the various steps of a procedure for configuring the actuator ACT3 employing a set-up function of the family 1 defined above.

In step 201, the user uses the tool on a set-up board NOT, shown in FIG. 3, to read information representative of the chosen set-up function. This information is stored in a memory MEMF.

In step 203, the installer uses the tool ST to read the information reproduced on the label L3 of the actuator ACT3, thereby placing this information in a memory MEMR.

After step 205 of confirmation by the installer, the tool ST constructs a message intended for the receiver RX3. This message contains the identifier of the message addressee (RX3) and an instruction or digital code corresponding to the set-up function read. This message is transmitted in step 207. When the receiver RX3 receives this message, it implements in step 209 the set-up steps as predefined in the actuator ACT3 and corresponding to the set-up function. The parameters detected during this set-up step are stored in memory during step 210.

Once the values contained in the memories MEMF and MEMR have been used to generate a first configuring message intended for the equipment ACT3, the content of the memories MEMF and MEMR, but also MEMS and MEMT, may be modified by erasure or by recording new values serving to define a new configuring message intended for equipment which may be the equipment ACT3 or other such equipment. In the case of successively sending a new configuring message to the equipment ACT3, it is unnecessary to re-input the identifier for RX3, said identifier still being in the memory MEMR. It is therefore the contents of the same memories MEMT, MEMR, MEMF and MEMS that are used to generate the various configuring messages.

Figure 5:
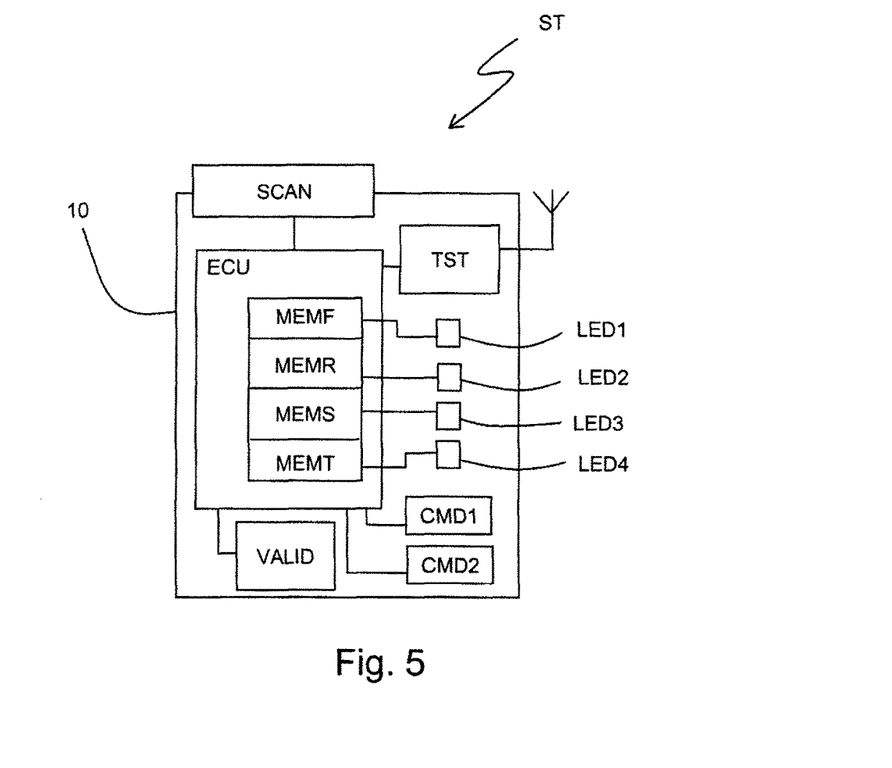
FIG. 5 is an embodiment of a configuring tool according to the invention.

FIG. 5 illustrates in greater detail the set-up tool ST.

This tool comprises, in a case 10, firstly a barcode reader SCAN and secondly a radio message transmitter TST, compatible with the receivers of the installation. The reader and the transmitter are connected to an electronic processing unit ECU, comprising a microprocessor and four memories MEMF, MEMR, MEMT and MEMS connected to various inputs/outputs of the microprocessor.

The tool ST also comprises light-emitting diodes for feedback, these light-emitting diodes also being controlled via the microprocessor.

Each light-emitting diode is representative of the state of one of the memories and is for example lit when the corresponding memory is filled.

The tool ST also includes control buttons VALID, CMD1, CMD2, the first serving to confirm and send a message generated on the basis of the content of the memories MEMF, MEMR, MEMT, MEMS, the second ones being designed for direct transmission of, for example, movement control messages or stop control messages.

Each memory is intended to receive a different type of information:
 the memory MEMR is intended to receive a home automation equipment identifier;
 the memory MEMT is intended to receive a command transmitter identifier;
 the memory MEMF is intended to receive a code determining a set-up function, for example a "high end-of-travel set-up" function or a "sensitivity threshold recording" function; and
 the memory MEMS is intended for receiving a code determining a parameter necessary for carrying out the set-up function encoded by the value contained in the memory MEMF, for example a sensitivity threshold parameter necessary for the "sensitivity threshold recording" function.

The values contained in these memories used to generate a first configuring message intended for equipment may be modified by erasure or by recording of new values serving to define a new configuring message intended for equipment.

The tool also includes software means for implementing the configuring method of the invention. It thus comprises means for carrying out the steps of claim 1 and means for implementing these steps in a logical order. In particular, the configuring tool comprises a means for generating a message comprising the content of the intended memory MEMR and the content of the second memory MEMF, MEMT.

Figure 6:
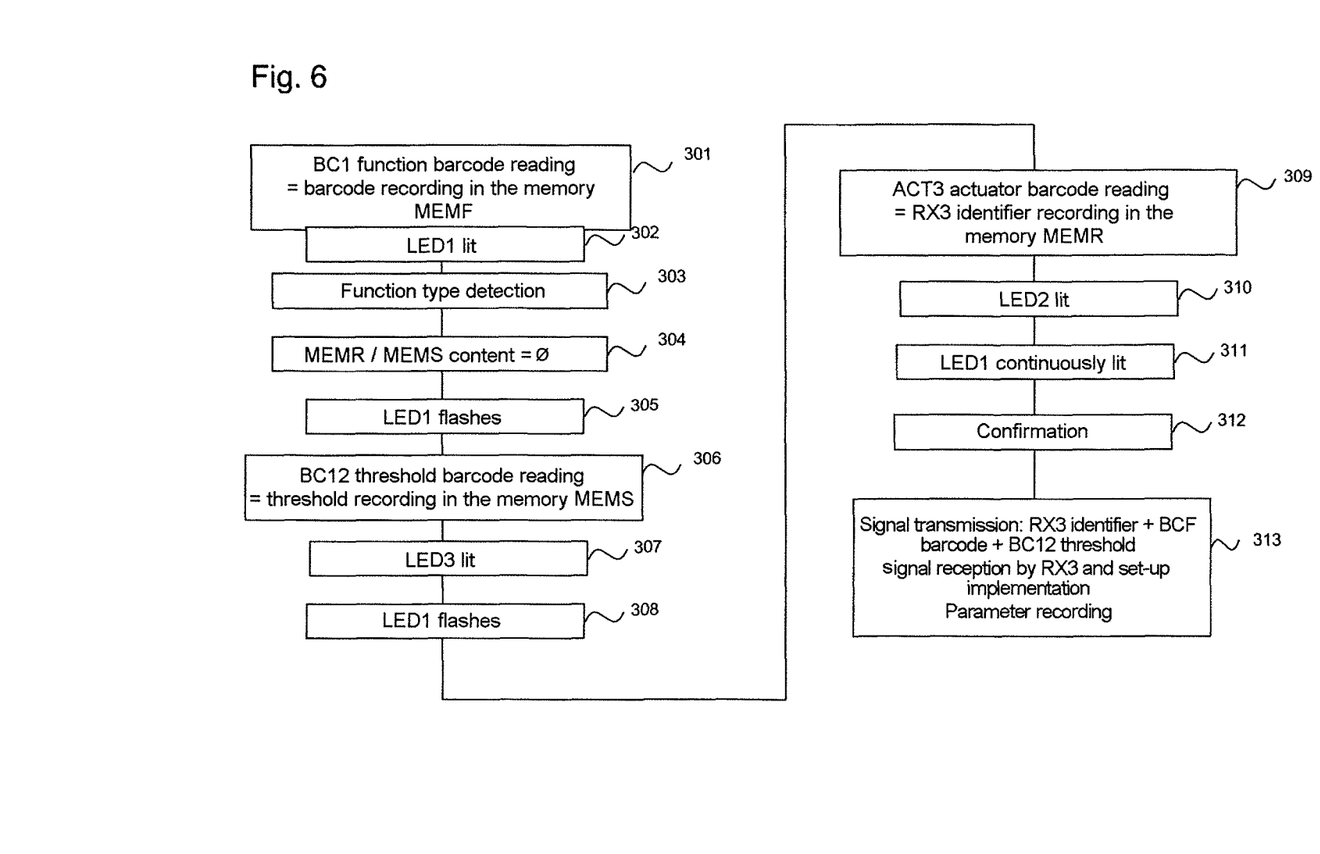
FIG. 6 is a flowchart for a configuring procedure implemented in an embodiment of a configuring method according to the invention.
Figure 7:
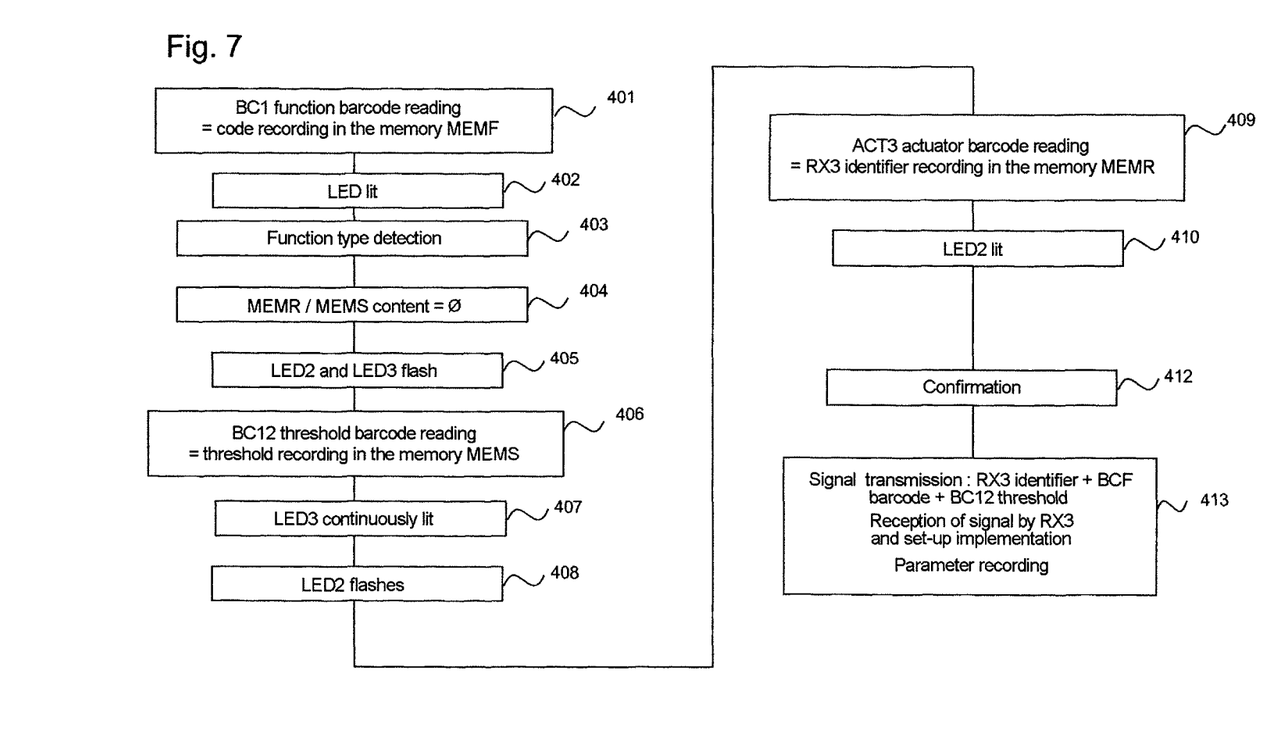
FIG. 7 is a flowchart for a configuring procedure implemented in an embodiment of a configuring method according to the invention.

FIGS. 6 and 7 show schematically various steps in procedures for configuring the actuator ACT3 employing a set-up function of family 3 defined above. FIG. 6 also illustrates a feedback action on the tool ST.

To simplify the diagram, the various memories of the tool are emptied on implementing the set-up step described.

In the example, the user wishes to set an obstacle detection sensitivity threshold. This is a function of family 3, i.e. two parameters are expected: the identifier of an actuator and a threshold level. The installer has, on his board, a barcode BC1 corresponding to this function and several barcodes BC11-BC15 representing the sensitivity levels. The actuator to be configured also has a barcode BCR placed on the equipment that it controls.

In step 301, the installer selects and reads the function barcode BC1 using the configuring tool ST. This barcode is recorded in the memory MEMF of the tool. The light-emitting diode corresponding to the functions is then lit during step 302. The type of function to which this barcode corresponds is automatically detected in step 303, i.e. the expected function parameters are defined.

In step 304, the electronic unit of the tool verifies whether the memories MEMR and MEMS already contain information. In the case of the example, the memories are empty. The electronic unit then makes the light-emitting diode corresponding to the functions flash during step 305.

The installer then uses the tool to scan (step 306) one of the threshold barcodes BC11 to BC15. The corresponding threshold is stored in memory. The light-emitting diode corresponding to the threshold is also lit (step 307). The function light-emitting diode continues to flash (step 308).

The installer then uses the tool to scan (step 309) the barcode BCR of the actuator to be configured. The corresponding identifier is stored in memory. The light-emitting diode corresponding to the actuators is also lit (step 310). The function light-emitting diode stops flashing (step 311).

The installer is then informed that all the expected parameters have been input. It then remains for him to confirm the function (step 312), i.e. to transmit a configuring message containing the information relating to the actuator, to the set-up function and to its threshold (step 313), equivalent to step 210 described above.

FIG. 7 illustrates the flowchart for an alternative action, for the same type of set-up function.

In step 401, the installer selects and reads the function barcode BC1 using the configuring tool ST. This barcode is recorded in the memory MEMF of the tool. The light-emitting diode corresponding to the functions is then lit during step 402. The type of function to which this barcode corresponds is automatically detected in step 403, i.e. the expected function parameters are defined.

In step 404, the electronic unit of the tool verifies whether the memories MEMR and MEMS already contain information. In the case of the example, the memories are empty. The electronic unit then makes the light-emitting diodes corresponding to the two expected parameters flash during step 405. The installer is then informed of the expected parameters.

The installer then uses the tool to scan (step 406) one of the threshold barcodes BC11 to BC15. The corresponding threshold is stored in memory. The light-emitting diode corresponding to the threshold is then continuously lit (step 407). The light-emitting diode corresponding to the actuators continues to flash (step 408).

The installer then uses the tool to scan (step 409) the barcode BCR of the actuator to be configured. The corresponding identifier is stored in memory. The light-emitting diode corresponding to the actuators is then continuously lit (step 410). The function light-emitting diode is also still lit.

The installer is then informed that all the expected parameters have been input. It remains for him to confirm the function (step 412), i.e. transmit a configuring message containing the information relating to the actuator, to the set-up function and to its threshold (step 413), equivalent to step 210 described above.

Figure 8:
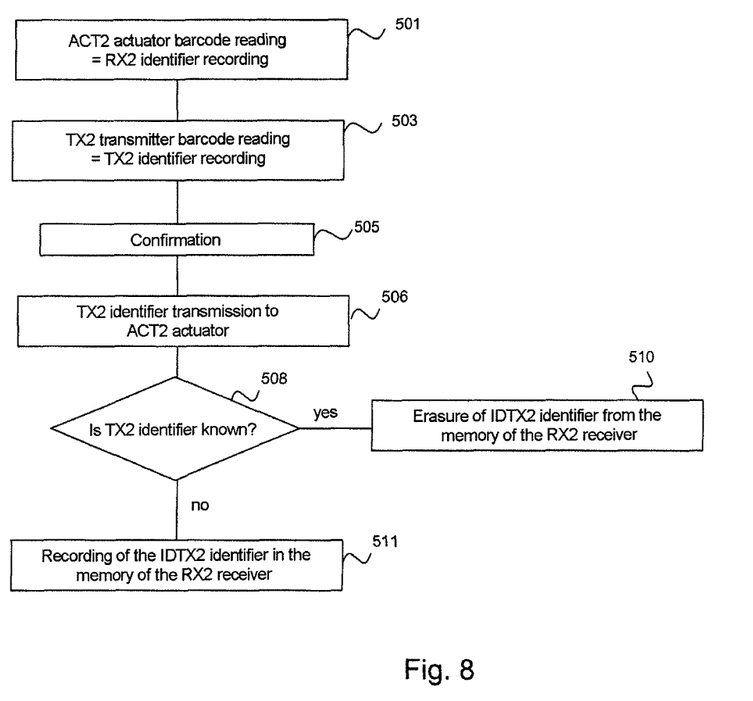
FIG. 8 is a flowchart for a configuring procedure implemented in an embodiment of a configuring method according to the invention.

FIG. 8 shows schematically the various steps of a procedure for configuring the actuator ACT2 employing a set-up function of family 2 defined above. FIG. 8 describes in particular the operation of the tool in a pairing case in which the board NOT described above is not necessary.

In step 501, the installer uses the tool ST to read the information reproduced on the label L2 of the actuator ACT2 to be configured, i.e. the information is decrypted and stored in tool memory. Next, he uses the tool again to read the information reproduced on the label LTX2 of the transmitter TX2 and this information is placed in memory (step 503).

In step 505, the user confirms this information, for example by pressing a confirmation button on the tool ST. This triggers step 506 in which the tool ST sends a message to the receiver RX2, containing the identifier of the transmitter TX2 and a default instruction corresponding to the pairing. When the receiver RX2 receives this message, it determines in step 508 whether the identifier of the transmitter TX2 is already in memory. If such is the case (step 510), he then considers that this transmitter must be unpaired which corresponds to erasing the virtual link existing between this transmitter and this receiver.

On the other hand, if the identifier of the transmitter TX2 is not known, the receiver RX2 proceeds to record this, and therefore establishes a new pairing link between these two objects during step 511. These steps 510 and 511 complete the pairing process.

In the prior art, the only possible way of removing an identifier of a defective transmitter from a list recorded in the memory of a receiver consists in erasing all these recordings. This is because, as communication with the receiver takes place via the transmitter, if the latter is defective there can be no possible action therein. In certain cases, the installer will have to reset all the set-ups to zero.

In step 511, whether the transmitter is a paired first transmitter or another, new transmitter, the receiver reacts in the same way. For a more secure system, the recording of a new transmitter takes place only if the receiver has received beforehand, or receives consecutively, a message from a known transmitter.

Once the values contained in the memories MEMT and MEMR have been used to generate a first configuring message intended for the equipment ACT2, the contents of the memories MEMT and MEMR but also MEMF and MEMS may be modified by erasure or by recording new values serving to define a new configuring message intended for equipment that may be the equipment ACT2 or some other equipment. It is therefore the contents of the same memories MEMT, MEMR, MEMF and MEMS that are used to generate the various configuring messages.

"Generation of a message" is also understood to mean "generation of a succession of messages for the purpose of transmitting the information read and stored in the tool, which information may possibly be transmitted in separate communication frames".

The invention claimed is:

1. A method of configuring at least one command receiver comprised in an item of equipment in a home in a home automation installation, the command receiver of the item of equipment being uniquely identified by an identifier recorded in a memory of the command receiver and duplicated on a medium accessible so that the identifier of the command receiver is visible, the configuring method using a configuring tool comprising an inputting means, a radio signal transmission means and at least a first memory and a second memory, the method comprising at least one iteration of the following steps:

a first step of inputting the identifier of the command receiver in the first memory of the configuring tool;

a step of presenting to an installer a plurality of set-up functions written on a notice;

a second step of inputting, by the installer, information of a first type in the second memory of the configuring tool, the information of the first type being distinct from the identifier of the command receiver, wherein the information of the first type is scanned by the configuring tool from amongst the plurality of set-up functions written on the notice;

a step of generating, in the configuring tool, a message comprising the identifier of the command receiver in the first memory and the information of the first type in the second memory;

a step of determining a type of an action based on at least the information of the first type;

a step of transmitting to the command receiver, by the radio signal transmission means, the message in the form of an electromagnetic signal, wherein the information of the first type does not include the identifier of the command receiver;

a step of carrying out, in the item of equipment, the action, which is at least partially determined by the information of the first type.

2. The configuring method as claimed in claim 1, wherein the message is transmitted by the configuring tool to the command receiver of the item of equipment.

3. The configuring method as claimed in claim 1, which includes an additional step of allowing the information contained in the first and second memories of the configuring tool to be modified.

4. The configuring method as claimed in claim 1, wherein the determined action is the start of a configuring function and/or the recording of operating parameters of the item of equipment.

5. The configuring method as claimed in claim 1, wherein the first type of information is characteristic of a command transmitter and wherein the action is the creation of a pairing link between the command transmitter and the command receiver, the pairing link being recorded in the command receiver.

6. The configuring method as claimed in claim 5, wherein the pairing link is a temporary link.

7. The configuring method as claimed in claim 1, wherein the first type of information is characteristic of a configuring function and wherein the action is an execution of this configuring function and a storing of parameters relating to this configuring function.

8. The configuring method as claimed in claim 7, wherein the message generation step comprises the use of the content of a third memory of the configuring tool, this third memory being intended to receive, after an input, information of a second type, the use being such that the message comprises the content of the third memory and the second type of information being characteristic of a parameter of the configuring function.

9. The configuring method as claimed in claim 7, wherein the message generation step comprises the use of the content of a third memory of the configuring tool, this third memory being intended to receive, after an input, information of a second type, the use being such that the message comprises the content of the third memory and the second type of information being characteristic of an object of a command transmitter type.

10. The configuring method as claimed in claim 1, which comprises, prior to the message generation step, a visual information step in the configuring tool in order to indicate whether or not the inputting steps have been correctly carried out.

11. The configuring method as claimed in claim 9, wherein the identifiers and/or the information of the first type and/or the information of a second type are in the form of a barcode.

12. A tool for configuring a home automation installation, comprising hardware and software for implementation of the configuring method as claimed in claim 9.

13. The configuring tool as claimed in claim 12, wherein the hardware comprises an inputting means, an electromagnetic signal transmission means, memories and an electronic processing unit.

14. The configuring tool as claimed in claim 13, wherein the inputting means comprises an optical scanner.

15. The configuring tool as claimed in 12, wherein the software means comprise programs stored in memory for governing the operation of the configuring tool.

16. The configuring method as claimed in claim 1, wherein the identifiers and/or the information of the first type and/or the information of a second type are in the form of a barcode.

17. The configuring method as claimed in claim 1, wherein the plurality of set-up functions comprises at least one set-up function selected from the group consisting of (i) a high end-of-travel set-up function and (ii) a sensitivity threshold set-up function and (iii) an automatic low end-of-travel set-up function.

* * * * *